(No Model.)

H. BEZER.
Nut Lock.

No. 242,500. Patented June 7, 1881.

WITNESSES:
E. B. Bolton
Sam'l Rupill

INVENTOR:
Henry Bezer.
By his Attorneys,
Barke, Fraser & Bennett

N. PETERS. Photo-Lithographer, Washington, D. C.

UNITED STATES PATENT OFFICE.

HENRY BEZER, OF LONDON, ENGLAND.

NUT-LOCK.

SPECIFICATION forming part of Letters Patent No. 242,500, dated June 7, 1881.

Application filed April 29, 1881. (No model.) Patented in England May 1, 1878.

*To all whom it may concern:*

Be it known that I, HENRY BEZER, of London, England, have invented certain new and useful Improvements in Means of Locking Nuts, of which the following is a specification.

This invention forms the subject of Letters Patent granted to me in Great Britain, dated May 1, 1878, No. 1,753.

The improvements essentially consist in the employment of a wire, a nail, or other suitable strip of metal in combination with a groove or recess in the nut to be locked, and with a groove or recess in the face of the plate or other thing against which said nut is to be locked, the said wire, nail, or strip being inserted into said grooves or recesses when the nut is slack, and the tightening up of the nut causing the wire, nail, or strip to be drawn into the nut and round the bolt, so that it forms a lock.

Figure 1:
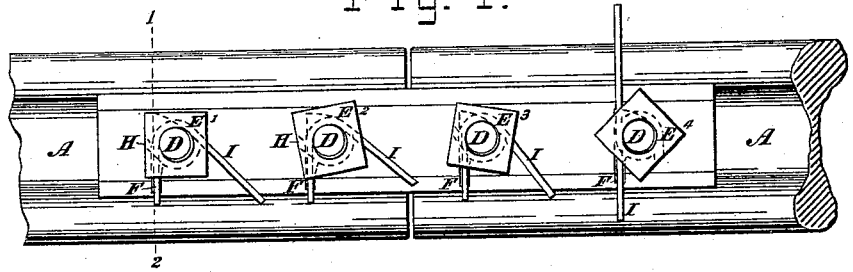
Figure 2:
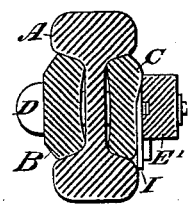
Figure 3:
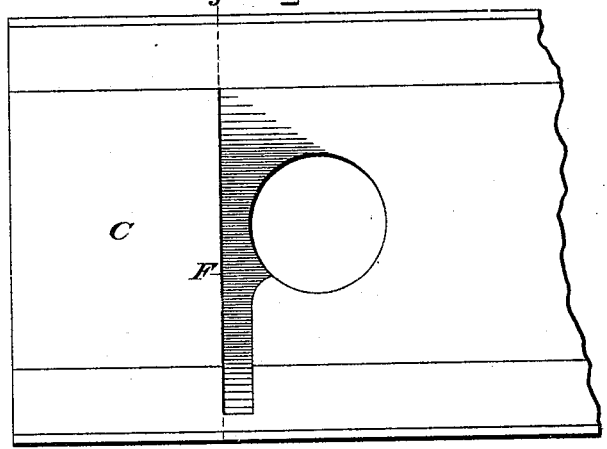
Figure 4:
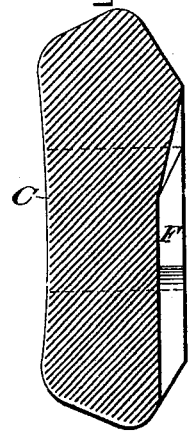
Figure 5:
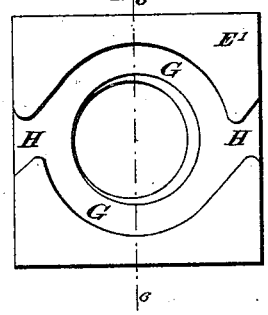
Figure 6:
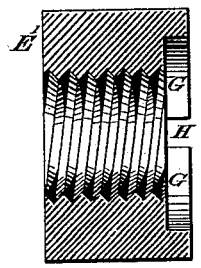

Figures 1 to 6 of the annexed drawings represent my invention applied to locking the nuts on the fastening-bolts of a railroad fish-joint or splice. Fig. 1 is a side view of the joint, and Fig. 2 a section on the line 1 2. Fig. 3 is a full-size view of part of the outer face of the plate C, and Fig. 4 a section on the line 3 4. Fig. 5 is a full-size view of the inside face of the nut, and Fig. 6 a section on the line 5 6.

A A are the two rails to be joined or spliced. B C are the two fish-plates on the opposite sides of the rails, respectively. D D are the fastening-bolts, passing through holes in the plates B C, in the ordinary manner. $E'$ $E^2$ $E^3$ $E^4$ are the nuts.

In the outer face of the plate C, at the side of each bolt-hole, I form a groove or recess, F, which tapers off at the upper part, as seen in Fig. 4.

In the inner face of each nut I form a groove or recess, G, around the central hole or orifice, and this groove at one, two, or more points (the drawings show two) extends to the outer edge of the nut in the form of a gap, H H.

I I represent the locking-wires.

The action or operation is as follows: The fish-plates having been applied, the bolts inserted, and the nuts screwed up tight, in the usual manner, the nuts are then (one at a time) slacked back until one of the gaps H is opposite the groove F in the plate C, as shown at the nut $E^4$, Fig. 1. The wire I is then inserted through the gap into the groove F, as also seen at the nut $E^4$. The nut is then screwed up tight again, the result of which is that the wire I is drawn into the groove G of the nut and round the bolt, the bottom portion of the wire remaining in the groove F of the fish-plate. (See nuts $E'$ $E^2$ $E^3$.) The nut is thus locked in position and cannot become loose without uncoiling the wire.

In practice I have found it desirable before inserting the locking-wires to tighten the nuts in the ordinary way for about three weeks, in order that the plates may become fairly bedded. Then I slack back the nuts and insert the wires, as already explained.

Figure 7:
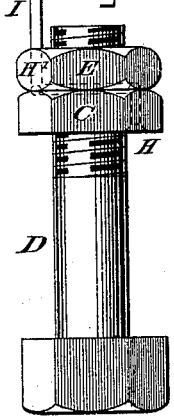
Figure 8:
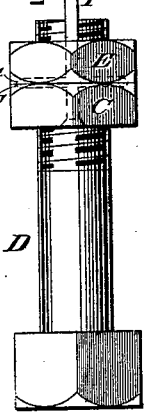
Figure 9:
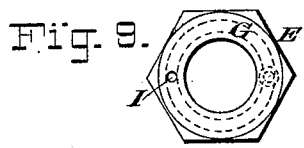
Figure 11:
Figure 10:

Figs. 7 to 11 illustrate the manner in which I apply my invention in cases where a nut is used to lock or check another nut. Figs. 7 and 8 are views, taken at right angles to each other, of the bolt, nut, and check-nut; Fig. 9, an end view of the same; Fig. 10, a section of the inner or first nut, and Fig. 11 a view of the locking nail or wire.

D is the bolt; C, the inner nut; E, the check-nut; F, a circular groove in that face of the nut C which comes in contact with the nut E. G is a corresponding groove in the face of the nut E.

H is a hole in the nut C parallel to its axis; $H'$, a similar hole in the nut E.

I is the nail or wire. It should be considerably longer than the combined thickness of the two nuts, and I prefer to use what is called a "French" nail.

The action is as follows: The nail I is passed through the holes H $H'$ in the two nuts, which are then, with the nail, as it were, loosely connecting them, screwed upon the bolt D until the nut C is in the required position, or in contact with the object to be fastened. Then the nut C is held by a spanner or otherwise, and the nut E is forced round the bolt D by means of another spanner, the result being that the nail I becomes bent, and the bent portion will, as seen in Figs. 7 and 8, occupy so much of the grooves F and G as is between the two holes H and $H'$ in their now altered relative positions. The nail thus forms a lock. The projecting end may be removed by a suitable tool.

What I claim, and desire to secure by Letters Patent, is—

1. The method of locking nuts by means of a wire, nail, or strip of metal, which, when the nut is slack, is inserted partly into a recess in the nut and partly into a recess in the plate or other thing against which said nut is to be locked, and which wire, nail, or strip, when the nut is screwed up tight, becomes bent and drawn into the nut, and thereby forms a lock, substantially as herein set forth.

2. The locking wire, nail, or strip I, in combination with the grooves or recesses F and G and gaps or openings H, substantially as herein described and shown.

In witness whereof I have hereunto signed my name in the presence of two subscribing witnesses.

HENRY BEZER.

Witnesses:
 GEORGE C. BACON,
 HUGH P. HOUGHTON.